US008751275B2

(12) United States Patent
Ramdattan et al.

(10) Patent No.: US 8,751,275 B2
(45) Date of Patent: Jun. 10, 2014

(54) METHOD AND COMPUTER PROGRAM PRODUCT FOR DEVELOPING A PROCESS-ORIENTED INFORMATION TECHNOLOGY (IT) ACTIONABLE SERVICE CATALOG FOR MANAGING LIFECYCLE OF SERVICES

(75) Inventors: Ramshankar Ramdattan, Bangalore (IN); Renjith Sreekumar, Kerala (IN); Sumitha Mahalingam, Bangalore (IN); Shailen Sagar, Mumbai (IN); Divya Makhija, Raipur (IN)

(73) Assignee: Infosys Limited, Bangalore, Karnataka (IN)

( * ) Notice: Subject to any disclaimer, the term of this patent is extended or adjusted under 35 U.S.C. 154(b) by 685 days.

(21) Appl. No.: 12/503,632

(22) Filed: Jul. 15, 2009

(65) Prior Publication Data
US 2011/0015964 A1 Jan. 20, 2011

(51) Int. Cl.
*G06Q 10/00* (2012.01)
*G06Q 30/00* (2012.01)

(52) U.S. Cl.
USPC ........ 705/7.12; 705/7.11; 705/7.23; 705/7.36

(58) Field of Classification Search
USPC ............................................. 705/7.11–7.42
See application file for complete search history.

(56) References Cited

U.S. PATENT DOCUMENTS

| | | | | |
|---|---|---|---|---|
| 2002/0059512 | A1* | 5/2002 | Desjardins | 713/1 |
| 2003/0135399 | A1* | 7/2003 | Ahamparam et al. | 705/7 |
| 2005/0044099 | A1* | 2/2005 | Soares et al. | 707/102 |
| 2005/0159969 | A1* | 7/2005 | Sheppard | 705/1 |
| 2006/0161444 | A1* | 7/2006 | Lubrecht et al. | 705/1 |
| 2007/0100685 | A1* | 5/2007 | Brickhaus et al. | 705/10 |
| 2007/0288275 | A1* | 12/2007 | Kumar | 705/7 |
| 2008/0126156 | A1* | 5/2008 | Jain et al. | 705/7 |
| 2008/0126163 | A1* | 5/2008 | Hogan et al. | 705/8 |
| 2008/0133259 | A1* | 6/2008 | O'Connor et al. | 705/1 |
| 2010/0036751 | A1* | 2/2010 | Eidt et al. | 705/27 |

OTHER PUBLICATIONS

Windley "The Discipline of Product Management" (2002) (http://www.windley.com/docs/Product/020Management.pdf).*
Moser, C. and Bayer, F., "IT Architecture Management: A Framework for IT-Services" In Desel, J. and Frank, U. eds. Proceedings of the Workshop Enterprise Modelling and Information Systems Architectures, Oct. 24--25, 2005, Klagenfurt, Austria, Gesellschaft für Informatik, Bonn, 137--151.*

* cited by examiner

*Primary Examiner* — Sujay Koneru
(74) *Attorney, Agent, or Firm* — Michael Best & Friedrich LLP

(57) ABSTRACT

The method for developing an actionable IT service catalog at large organizations is disclosed. IT Service catalog helps IT organizations showcase the value of IT services they deliver to their business customers. Service catalogs are made actionable by incorporating Service Request and Service portfolio functions for the in scope services. The method focuses on articulating and documenting these services, facilitating service request and fulfillment and modeling/modifying service portfolios The method is comprising of service domains for services to move through various lifecycle stages within the IT service catalog from their point of inception to it's decommission; and domain components for each service domain to fulfill certain objectives during the services' journey through the IT Service Catalog. The proposed method is a process oriented framework to the development of IT Service Catalog at large organizations.

16 Claims, 9 Drawing Sheets

METHOD AND COMPUTER PROGRAM PRODUCT FOR DEVELOPING A PROCESS-ORIENTED INFORMATION TECHNOLOGY (IT) ACTIONABLE SERVICE CATALOG FOR MANAGING LIFECYCLE OF SERVICES

BACKGROUND

The invention relates generally to service catalog, and more particularly relates to actionable information technology (IT) service catalog framework.

The IT Service catalog is a solution that helps IT organizations showcases the value of IT services they deliver to their business customers. It focuses specifically on articulating and documenting these services, facilitating service request and fulfillment and modeling/modifying service portfolios.

The disconnect between business goals and IT priorities consistently ranks among the top three issues facing chief information officers (CIOs) year after year. At the heart of this problem is a lack of trust between customers and IT, where Business customers and end-users do not trust that IT organization is capable of taking the business forward. Faced by these challenges, many IT organizations are in the midst of transforming to a customer-centric & demand-driven service model. Service Catalog is essentially the first step—and a fundamental requirement—in transforming the IT organization by re-establish the trust between IT and Business IT Infrastructure Library (ITIL) V2 & V3 provides an overview of the need for a Service Catalog, however there is no practical guidance on how to build and manage them.

Service catalog products and software tools available in the market provide a variety of functionalities for organizations to help them configure services. However they do not provide the step-by-step guidance to implement services, in alignment with service stakeholders and customer needs, and manage them in the catalog.

During Service Catalog adoption, large IT organizations typically face the following challenges: Determining the scope of services and identification of service owners; Understanding the mapping of Multiple vendors' and internal IT services, for bundling into the Service Catalog; Define to-be state for services and manage their overall lifecycle; and Drive improvements to services and the catalog.

Organizations tried to address the Service Catalog implementation from a conventional technology solution standpoint, assuming that the technology will enable them to design and manage services end-to-end. However there were many critical aspects with respect to the program that the technology or even the best practices framework like ITIL cannot address.

Due to the lack of reference standards in this area, organizations are increasingly looking at practitioner guidance and direction in building and managing actionable service catalogs.

Hence, there was need for strategic framework that provides end to end guidance to manage the lifecycle of services through service discovery and drive improvements to the service experience and customer satisfaction. The proposed framework components enable an organization to jumpstart and manage a service catalog program end-to-end.

BRIEF DESCRIPTION

In one embodiment of the present technique, a method for developing an IT service catalog at large organizations is disclosed. The method is comprising of service domains for services to move through various lifecycle stages within the IT service catalog from their point of inception to it's decommission; and domain components for each service domain to fulfill certain objectives during the services' journey through the IT Service Catalog. The proposed method is a process oriented framework to the development of IT Service Catalog at large organizations.

The proposed method (or framework) provides end to end guidance to manage the lifecycle of services through service discovery and drive improvements to the service experience and customer satisfaction. The framework components enable an organization to jumpstart and manage a service catalog program end-to-end.

In another embodiment of the present technique, a method defines five lifecycle domains called Service Domains. The lifecycle activities of services in these domains are facilitated through four domain components viz. Processes, Process Assets, Domain metrics and Process roles. The proposed framework is scalable and can be utilized as a framework for building and managing business or technology oriented service catalogs.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
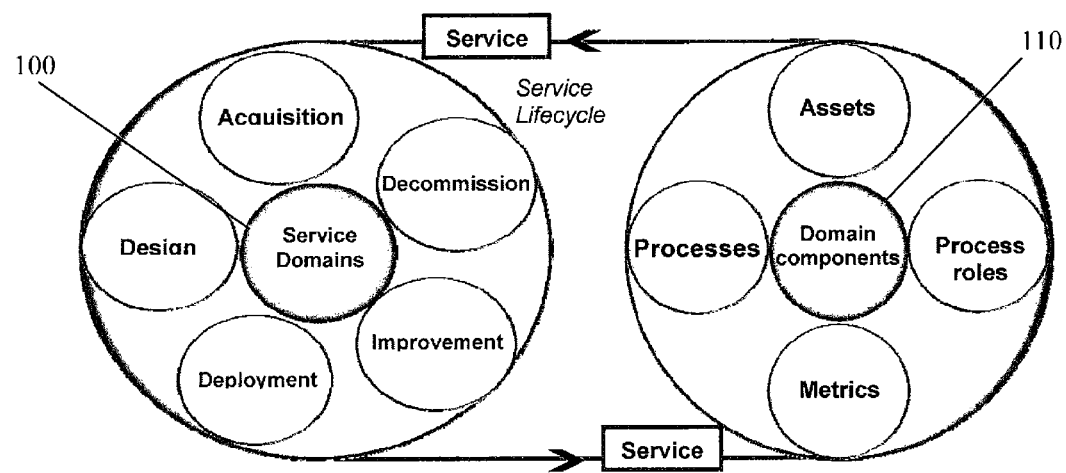
FIG. 1 is a schematic representation of a proposed framework for actionable IT service catalog, in one embodiment of the present technique.

The following description is full and informative description of the best method and system presently contemplated for carrying out the present invention which is known to the inventors at the time of filing the patent application. Of course, many modifications and adaptations will be apparent to those skilled in the relevant arts in view of the following description in view of the accompanying drawings and the appended claims. While the system and method described herein are provided with a certain degree of specificity, the present technique may be implemented with either greater or lesser specificity, depending on the needs of the user. Further, some of the features of the present technique may be used to advantage without the corresponding use of other features described in the following paragraphs. As such, the present description should be considered as merely illustrative of the principles of the present technique and not in limitation thereof, since the present technique is defined solely by the claims.

As a preliminary matter, the definition of the term "or" for the purpose of the following discussion and the appended claims is intended to be an inclusive "or" That is, the term "or" is not intended to differentiate between two mutually exclusive alternatives. Rather, the term "or" when employed as a conjunction between two elements is defined as including one element by itself, the other element itself, and combinations and permutations of the elements. For example, a discussion or recitation employing the terminology "A" or "B" includes: "A" by itself, "B" by itself and any combination thereof, such as "AB" and/or "BA." It is worth noting that the present discussion relates to exemplary embodiments, and the appended claims should not be limited to the embodiments discussed herein.

The present invention relates to service catalog, and more particularly to actionable information technology (IT) service catalog framework.

The disconnect between IT and Business has triggered the need for an actionable Service Catalog, where IT communicates its values to its customers and is treated as a profit center rather than a cost center. To run IT in a customer oriented and service centric fashion, the service customers need to be provided with transparency and visibility into the services and value delivered by IT. Actionable catalog offers a service interface for business, IT and end-users to request, approve and track services and its delivery.

The IT Service catalog is a solution that helps IT organizations showcases the value of IT services they deliver to their business customers. It focuses specifically on articulating and documenting these services, facilitating service request and fulfillment and modeling/modifying service portfolios. Organizations are increasingly adopting actionable service catalogs and adopting a "services" view as recommended by industry standard frameworks as in ITIL V3. Service catalogs are made actionable by incorporating Service Request and Service portfolio functions for the in scope services. This capability should allow customers and end-users to browse through services, their attributes, options and costs and request them as needed.

In one embodiment of the present technique, a method for developing an IT service catalog at large organizations is disclosed. The method is comprising of service domains for services to move through various lifecycle stages within the IT service catalog from their point of inception to it's decommission; and domain components for each service domain to fulfill certain objectives during the services' journey through the IT Service Catalog. The proposed method is a process oriented framework to the development of IT Service Catalog at large organizations.

The proposed actionable service catalog method is a strategic framework that has components that will help organizations jumpstart or manage Service catalog initiative.

The proposed method or framework help organizations plan, design and implement actionable service catalog and manage the life cycle of the services effectively and predictably through the usage of framework components.

Referring to FIG. 1 which is a block diagram of the proposed framework for actionable service catalog. The Service Domains 100 represent the different stages in the life cycle of a service. Each Domain fulfills its objectives through the Domain components 110.

Figure 2:
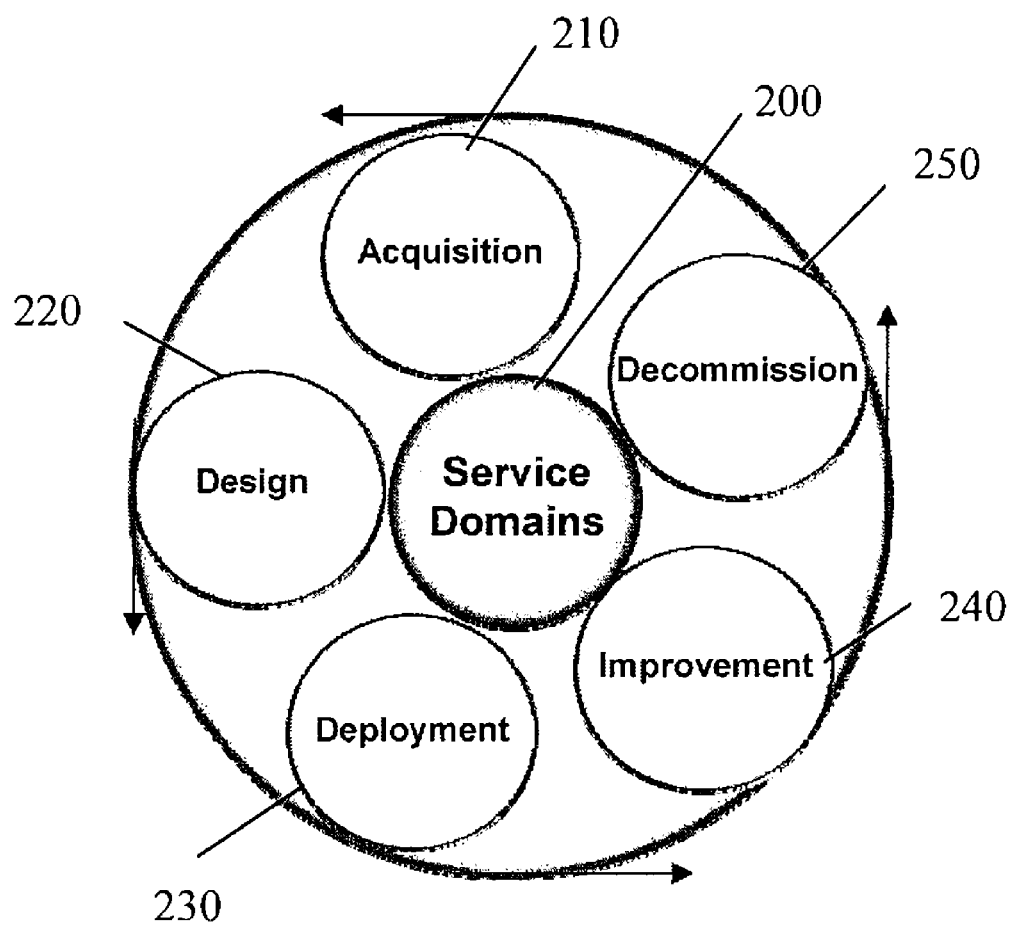
FIG. 2 is a block diagram of a service domains of the proposed framework, in one embodiment of the present technique.

Referring to FIG. 2 which shows the service domains i.e. the different stages within the lifecycle of a service. Services move through various lifecycle stages within the catalog from their point of inception to its decommission. These stages within the lifecycle of a service are called Service domains 200. Each domain represents a unique nature of a service in terms of its structure, composition and behavior. There are following service domains as shown in the FIG. 2: Service Acquisition 210, Service Design 220, Service Deployment 230, Service Improvement 240, and Service Decommission 250.

Service Acquisition 210: This is a domain where the needs for services are validated and service information are gathered effective & timely through structured service engagements.

Service Design 220: This is a domain where the service requirements are translated to design specifications to facilitate an automated request and fulfillment processes.

Service Deployment 230: This is a domain where the service design specifications are translated into configurable service objects and exposed to customers.

Service Improvement 240: This is a domain where services are constantly improved in terms of delivery and user experience through a constant cycle of monitoring, reporting and enhancements.

Service Decommission 250: This is a domain where the services are optimized in a cost effective manner by transforming services or decommission of services with minimal or no organizational impact.

Figure 3:
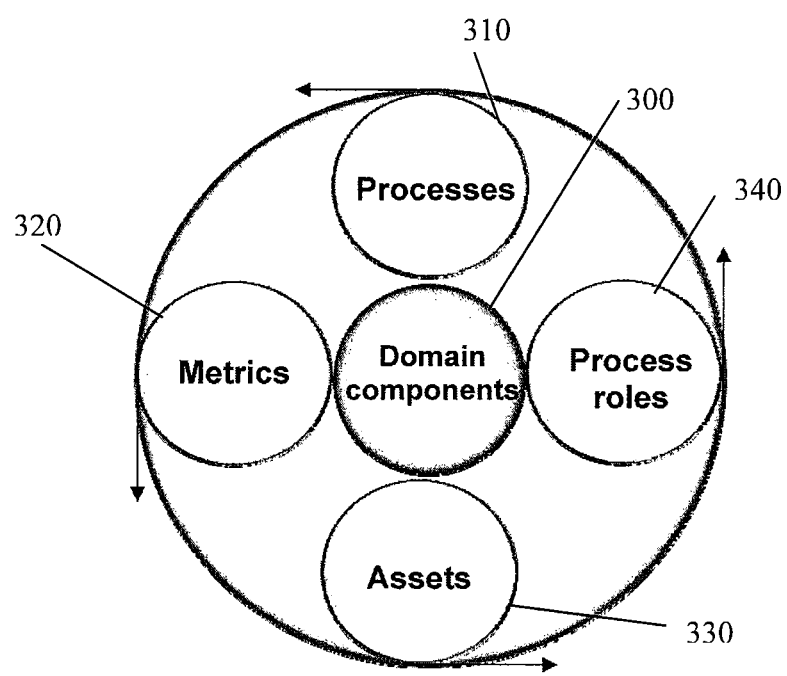
FIG. 3 is a block diagram of a domain components of the proposed framework, in one embodiment of the present technique.

Referring to FIG. 3, which shows the different domain components of the proposed method/framework. There are following domain components 300 as shown in the FIG. 3: Processes 310, Metrics 320, Assets 330, and Process Roles 340.

Processes 310: These are sequence of activities performed to manage services in its lifecycle domains.

Metrics 320: These are set of parameters defined for tracking and improvement of services within their Domains.

Assets 330: This enables decision making and movement of Services through the Service domains.

Process Roles 340: These are roles that facilitate the end to end flow of services through the Service Domains.

Each Service domain fulfills certain objectives during the services' journey through the IT Service Catalog. The Domain objectives are fulfilled through the following Domain components are as follows:

Processes 310: The processes provide a step by step procedure for the Service Domains to accomplish their objectives.

Process Roles 340: The roles that control and monitor the Domain processes

Assets 330: Various process assets that captures service information & enable effective decision making Metrics 320: The measurement and improvement of services are enabled through metrics.

In another embodiment of the present technique, there are several service groups are associated with the proposed method/framework. Following Table 1 shows the various service groups and their roles and functions in the proposed framework.

TABLE 1

Service Groups and their Functions

| Service Groups | Role Description/Functions |
| --- | --- |
| Service Relations group (SRG) | Service Relations Group (SRG) is a group responsible for coordinating the new service engagements. They create awareness about the service catalog program among the service stakeholders and engage service owners to absorb services in the catalog. |
| Service Implementation group (SIG) | Service implementations Group (SIG) oversee the service design and deployment activities and coordinates activities between the service owners, design teams and deployment teams for effective service development and rollout. |
| Service Assurance group (SAG) | Service Assurance Group (SAG) ensure timely improvements for services and service catalog including delivery process, usability, training and support. They also ensure controlled change management for service improvements and decommissioning so that end users are least impacted and business continuity is ensured. |
| Service Anchors | Service Anchors coordinate all project level activities for the service absorption and support. They periodically communicate the status to higher management. They provide direction to project/delivery teams for task execution and information updates to SRG & SIG |
| Service Enhancers | Service Enhancers coordinate the service improvement activities by keeping track of improvement opportunities and obtaining required approvals for executing changes. They provide inputs to monitoring and reporting team, user interface teams and delivery team to execute service improvements and changes |
| User Interface team | User Interface team is responsible for identifying end user satisfaction levels. They also provide inputs for service design for the service and catalog usability and also review service design/improvements for usability. |
| Delivery team | Delivery teams are the project teams responsible for service deign, deployment, improvement and decommissioning execution. |
| Monitoring and reporting team | Monitoring and reporting teams maintain and measure service and catalog metrics and provide timely reports to SAG. |

Figure 4:
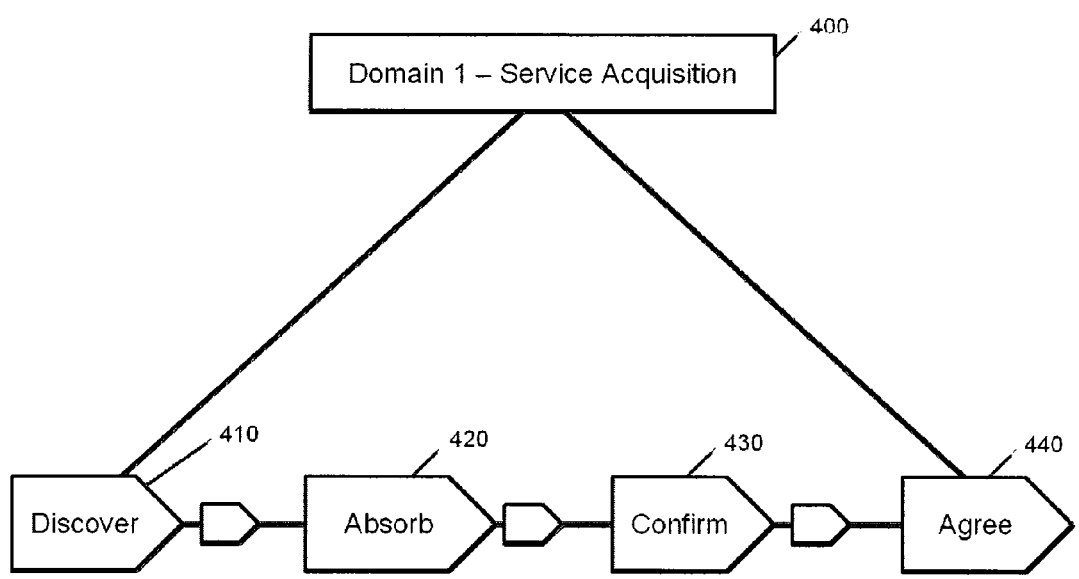
FIG. 4 is a diagram showing the various processes associated with the service acquisition domain of the proposed framework, in one embodiment of the present technique.

Each service domain has various processes associated with it. Referring to FIG. 4 which shows the processes associated with the Service Acquisition domain. Service Acquisition 400 aims at obtaining alignment & sponsorship from organization Service group leadership on service catalog program and enables Relationship team to gather requirements and translate to build an Engagement Plan. Service Acquisition 400 also lays the foundation for initial assessments and validation of services in the engagement plan to help create a Release Plan for the implementation team.

Referring to FIG. 4, the Discover process 410 sets the base for enabling absorption of services into the Service Catalog. It defines a mechanism to build an engagement plan through a leadership aligned Strategy. The process engages service groups to create awareness and set expectations for the engagement through workshops. The project teams for service engagements are identified and initial engagement plan is created. A high-level, initial list of services to start the service engagements is identified and validated with service owners during this process. It also enables a mechanism to capture ad-hoc requests (dynamic requests that may rise during engagements). Templates/Assets are used to facilitate the processes. All details relevant to the engagements are updated in a single repository referred to as the Service Knowledge base (SKB).

Referring to FIG. 4, the absorb process 420 helps effective capture of service information to enable appropriate analysis and design of the Service in the IT Service Catalog. It provides high level procedures to collate service requirements pertaining to usability, business requirements, provider requirements, technical and system requirements. The readiness of the gathered requirements is assessed during this process and requirements gathering is re-initiated as needed.

Referring to FIG. 4, the confirm process 430 helps collates the requirements gathered in the previous phase and defines, verifies and validates the service Point of Arrival (POA) model. The POA model is validated with all service stakeholders during this process. The POA model defines high-level funding and resourcing needed for executing the implementation plan. A System Analysis Report (SAR) is created to document the analysis of requirements, POA model and design expectations. SAR is used as reference point for Service design documentation and Service deployment.

Referring to FIG. 4, the agree process 440 helps ensure that all stakeholders are aligned with the System Analysis Report (SAR). The SAR need to be in-line with the service strategy recommendations. If there are acceptance issues, the SAR needs to be modified to incorporate changes. The approval of SAR kicks off the design activities. The engagement plan needs to be updated with the details of approval/rejection & lessons learnt. A high level Release plan is finalized. The process ensures that all documentation is stored at central location for access by various teams during subsequent processes.

The following Table 2 shows the process assets and their role description and usage with respect to the service acquisition domain.

TABLE 2

Process Assets for Service Acquisition Domain

| Process Assets | Description | Usage | Process Areas |
|---|---|---|---|
| Engagement Plan | A plan that keeps track of Service engagements | Helps in identifying potential groups that need to be engaged and tracks the ongoing engagements | Discover |
| Catalog Overview deck | Overview of Service Catalog program | Provides insight of the program to service stakeholders | Discover |
| Initial Services list | List of potential services to start discussions for the engagement | Initial list of services for the engagement, that would eventually be validated and accepted for the Release | Discover |
| Initial Project plan | Capture initial project plan details for service engagement | The initial Project Plan is created based on understanding & updated periodically to reflect status of the engagement | Discover |
| ER/Ad-hoc ER | Engagement Request & ad-hoc requests | Record for tracking specific service engagement | Discover |
| Service Requirement gathering template | Gather Provider & Business requirements | Used by Service Owners/ SME/Provider to capture service needs | Absorb |
| Usability & SLA Requirements | Customer needs in terms of usability and SLAs | SLA & usability requirements that are captured and validated with providers & customers | Absorb |
| High-level technical requirements | Detailed technical requirements gathered for the service | Detailed requirements used in creating the POA model | Absorb |
| Reporting requirements | Detailed Service related reporting requirements | Detailed requirements used in developing the service related reports within Service Catalog | Absorb |
| Project plan | Initial Project plan | Project Plan created based on high level information gathered | Absorb |
| Service readiness checklist | Readiness criteria for the information gathered | Used to validate level of accuracy & completeness of information gathered | Absorb |
| Service standards (SLAs) | Required SLAs for services | Provides Service level related recommendations based on current & business needs | Confirm |
| Usability recommendations | Required usability standards | Recommendations based on current and business needs | Confirm |
| POA model | Point of arrival model for service | POA model for services created based on the current and future service needs | Confirm |
| POA recommendations & Cost est. report | Point of Arrival & cost estimation report | Report feasibility of POA model & recommend any required changes | Confirm |
| System Analysis Report (SAR) | High-level Service Analysis Report | SAR provides a summary of service needs, POA model its feasibility, cost & resource estimate to the committee layer to enable approval of the engagement request | Confirm |
| Potential Release Plan | Estimated calendar for Service releases | Potential release dates for services within the engagement plan | Confirm |
| Release Plan | Release timelines for services | Capture services scheduled as part of a release, capture dependencies and order of release | Agree |
| Key learnings document | Detail the learning from the engagement | Used to leverage learning in future engagements | Agree |
| Design Handover checklist | Handover checklist | Checklist to ensure completeness of service requirements documents before it proceeds for design phase | Agree |

Figure 5:
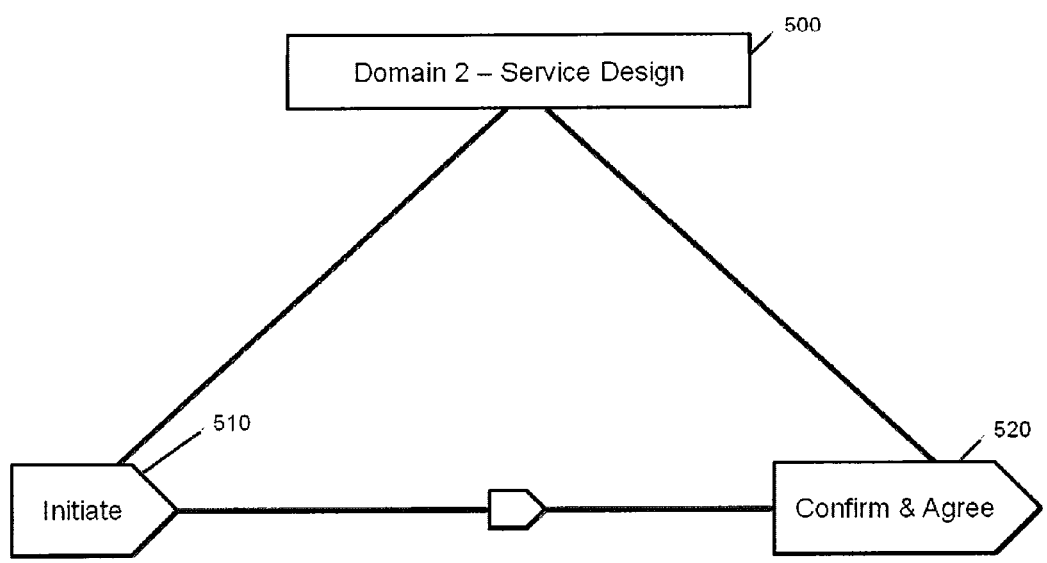
FIG. 5 is a diagram showing the various processes associated with the service design domain of the proposed framework, in one embodiment of the present technique.

Referring to FIG. 5, which shows the processes associated with the Service Design domain. Service Design 500 aims at translating the service requirements gathered into design specifications for services that need to be populated in the catalog. Service Design 500 provides the foundation for defining & validating service configuration and workflows for the implementation team.

Referring to FIG. 5, the initiate process 510 facilitates the formal handover of all relevant documentation from the Acquisition phase to the Design phase. It involves engaging project team for detailed analysis of POA model & requirements enabling evolution of design for the service. The Project team liaises with the Relationship team, service owners, business & providers for any additional information required as part of their analysis. The team develops the Design document detailing to be workflows and configuration. A draft project plan is created to start the design phase activities. Based on the detailed design, the project plan and the resource plan are updated.

Referring to FIG. 5, the confirm & agree process 520 involves gaining alignment from service stakeholders on the service design. Once the high-level design is created, the project team obtains alignment from service owner for the configuration and design of service & subsequently obtains alignment from Service Anchors Team for resource requirements and release timeliness. In the instance of non-alignment the 'Initiate' process is triggered to re-validate the Design document and incorporate modifications. The details are updated in the final project plan and Service Knowledgebase (SKB) is updated based on the findings of the design stage. The process 520 also takes care of preparation for design walkthrough by the design team to the development teams.

The following Table 3 shows the process assets and their role description and usage with respect to the service design domain.

Figure 6:
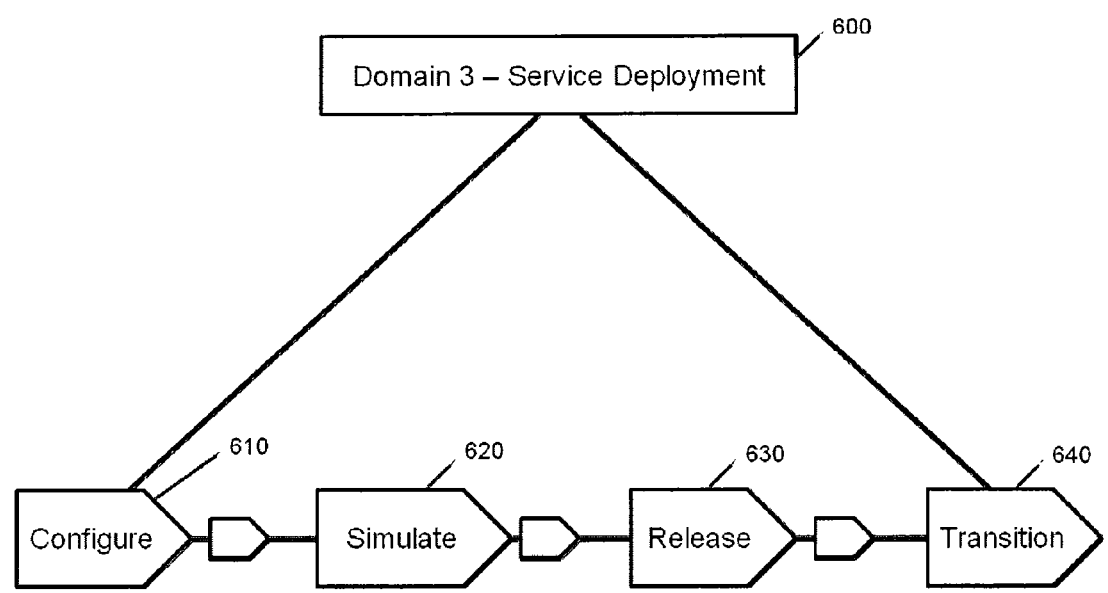
FIG. 6 is a diagram showing the various processes associated with the service deployment domain of the proposed framework, in one embodiment of the present technique.

Referring to FIG. 6, the configure process 610 focuses on creating initial service design prototype/mockup and validating it with service stakeholders. It outlines the steps associated with configuring services in the development environment including the provisioning system. Test cases for the services are created and validated. Unit level testing is performed and test plan is updated. The unit testing is conducted during this process in the development environment and further tests or design changes are derived based on the result of testing.

Referring to FIG. 6, the simulate process 620 focus on conducting system testing for the configured services in test environment. The defects identified are validated for configuration or design level changes. All the defect resolution changes are carried out in the development environment with controlled version changes. Based on the test results and validation, services are promoted to the production environment for conducting UAT. The process 620 also facilitates exception approval for those issues that are not configuration or design related. In the instance of unapproved exceptions the 'Design' domain for the service is revisited.

Referring to FIG. 6, the release process 630 ensures release of service into production environment. The process outlines various pre-requisites that enable this movement including deployment plan verification, identification of support teams, readiness assessments, and creation of training manuals and FAQ for support teams. The rollout and back out plans are also created for the service and approved from service implementations teams before the final rollout to ensure minimal impact to production environment. In the instance of an unsuccessful deployment, the service is backed out & a post implementation review is conducted for review and documentation of learning's. The process 630 ensures effective transition of service to production environment and readiness levels of support teams. It also initiates retirement activities for any existing service to be retired as per new service plans.

TABLE 3

Process Assets for Service Design Domain

| Process Assets | Description | Usage | Process Areas |
|---|---|---|---|
| Design Handover checklist | Handover checklist | Checklist to ensure completeness of service requirements documents before it proceeds for design phase | Initiate |
| Service configuration template | Template to gather service configuration information | Instructions and guidelines to capture different customizations for service (configurations) and workflows associated | Initiate |
| Design document | Document that provides design specifications for the Service | Detailed design specifications for the service along with detailed workflows & configuration details | Initiate |
| Design phase summary document | Document that provides design specifications summary for the Service | Design phase summary document provides a high level overview of the design for Committee layer review | Confirm & Agree |
| Finalized Project plan | Project plan | Updated Project Plan based on approved design documents, resource and cost estimate | Confirm & Agree |
| Walkthrough documents | Design walkthrough documents | Documents needed for Development team walkthrough | Confirm & Agree |

Referring to FIG. 6, which shows the processes associated with the Service Deployment domain. Service Deployment 600 aims at translating service design specifications into configurable service objects within the Service Catalog. Service Deployment 600 ensures that required documentations and training are executed and communication is rolled out to enable effective usage of services rolled out.

Referring to FIG. 6, the transition process 640 covers service transition to the support teams. The support is transitioned in a phased manner to ensure knowledge transfer and reduced impact to services. Transition plan and support handover documents are prepared for this purpose. Communication to the stakeholders and user community plays important role in this process for effective transition of service support.

The knowledge transfer is carried out in two phases to ensure and validate the ability of support team to support the transitioned services. A formal transition sign-off procedure is followed to ensure readiness of the support team to support the service.

The following Table 4 shows the process assets and their role description and usage with respect to the service deployment domain.

TABLE 4

Process Assets for Service Deployment Domain

| Process Assets | Description | Usage | Process Areas |
|---|---|---|---|
| Service Mock-up Template | A document used to detail the mock-ups for services | Used for conducting mock-ups and documenting key learnings | Configure |
| Test Document | A document for planning and testing of the services in Test env. | Testing plan for service with detailed test cases and timelines | Configure |
| Services in Dev | Services in Development Environment | Services are configured in Dev environment during service build | Configure |
| Defect Details form | Defects capture | Record for tracking specific defects | Simulate |
| Defects Tracker | Defects Tracker | Track defects identified during development & testing | Simulate |
| UAT Results | User Acceptance Testing results | Details of user acceptance testing Provide details of any anomalies observed | Simulate |
| Training manuals and service FAQ | Training manuals and Frequently Asked Questions related to service | Information on service usage in and list of FAQ to answer queries of users | Release |
| Rollout & back-out plan | Service rollout and backout plan | Step by step instructions on service roll out and back (in case of roll out failure) | Release |
| Service Readiness checklist | Service Readiness checklist for production readiness | Check service readiness for enabling it to end users. | Release |
| Implementation review | Review of roll out or back out | Used to record details & analyze the implementation | Release |
| Handover docs | Handover document for support team | Capture issues and other knowledge documents related to service support | Transition |
| Transition plan | Service support transition plan | Plan with timelines and instructions for service support transition to support team | Transition |
| Transition Checklist | Transition Checklist | Checklist to ensure completeness of transition | Transition |

Figure 7:
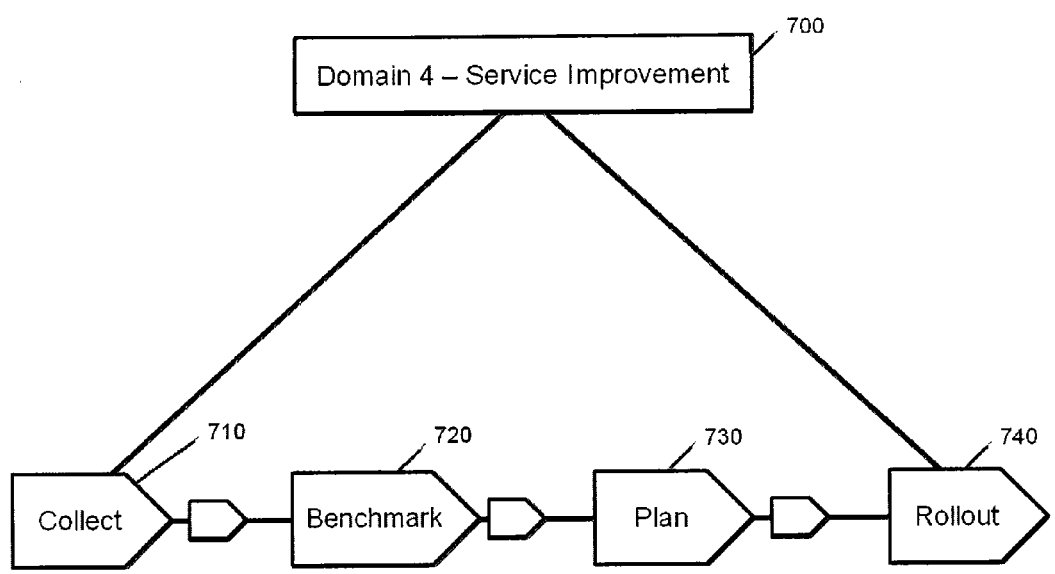
FIG. 7 is a diagram showing the various processes associated with the service improvement domain of the proposed framework, in one embodiment of the present technique.

Referring to FIG. 7, which shows the processes associated with the Service Improvement domain. Service Improvement 700 aims at improving the services, service delivery and the end user experience of the service and Service Catalog tool through a constant cycle of reviewing, reporting and recommending improvements to the services. Service Improvement 700 ensures that timely upgrades are provided for services, bugs are fixed, tool is enhanced and aligned with product plan so that end to end service experience can be maintained and improved.

Referring to FIG. 7, the collect process 710 outlines the types of data that need to be collated periodically to review the service catalog performance. The data include service performance feedback, service delivery information, catalog performance data and usability related data. The reporting team creates custom reports based on the performance data collated by monitoring team. The process 710 ensures that the reports are validated before sending it to the Service Level manager for further analysis. These reports are reviewed to identify improvement opportunities. The Service level manager maintains a log of the improvement opportunities identified to enable tracking of enhancements to the services.

Referring to FIG. 7, the benchmark process 720 deals with analyzing the service delivery reports to identify improvement opportunities with respect to service delivery, catalog performance and usability of services. The service enhancers' team reviews the reports with service stakeholders to identify improvement opportunities. These opportunities are analyzed & action items tracked and reported. The process 720 outlines the steps to conduct service review meetings to identify and validate improvement opportunities and recommendations. Improvement proposals are created for identified opportunities based on recommendations from service stakeholders.

Referring to FIG. 7, the plan process 730 focuses on evaluating the impact of service improvement on service strategy of the organization, service delivery, catalog performance and other related or composite services. Based on the impact levels, subsequent actions and approvals need to be facilitated. The process ensures that all improvement opportunities are tracked and updated with all the subsequent actions and approvals. The process 730 ensures that the end-users are proactively communicated about any changes to the services. Service stakeholders also need to be communicated on any downstream/upstream, process or delivery related changes.

Referring to FIG. 7, the rollout process 740 focus on deployment of service improvement changes through controlled change execution. The service improvements are executed based on the type of change required and monitored for successful execution. The improvements are routed to the appropriate groups to enable effective roll out and execution of Change with minimal impact. An implementation review report is prepared and summary of the activities are provided to stakeholders and PMO. If the improvement execution fails, the back-out plan is executed and incident is reviewed to recommend proactive measures for future changes.

The following Table 5 shows the process assets and their role description and usage with respect to the service improvement domain.

TABLE 5

Process Assets for Service Improvement Domain

| Process Assets | Description | Usage | Process Areas |
|---|---|---|---|
| SIO Tracker | Service improvement opportunity tracker record | Capture & track service improvement opportunities | Collect |
| Survey questions & Portal | Questions for user feedback Platform for the surveys | Survey questions to capture end user feedback on service delivery, catalog performance, usability | Collect |
| Usability Reports | Usability analysis report | User feedback analysis on services & delivery of service through the catalog | Collect |
| Service Feedback report | Feedback on fulfillment of services | Feedback report based on end user perception on service fulfillment | Collect |
| Service Delivery report | Report on day to day tracking of delivery of services | Track service delivery against SLAs | Collect |
| Service review meeting agenda | Service review meeting agenda | Detail out the discussion points considered, related to service improvement opportunity | Benchmark |
| Service Issues & Opportunities Tracker | Issues & Opportunities Tracker | Capture and track service improvement opportunities along with details | Benchmark |
| SIO Proposal | Proposal for improvement | Proposed focus areas, action items to be considered for Service improvement | Benchmark |
| SIO criteria document | Service Improvement Opportunity —Impact criteria | Criteria used to assess the level of impact of SIO on Strategy, service operations & delivery processes | Plan |
| Service Improvement Plan | Detailed plan to execute Service Improvements | Detailed plan with associated timelines & dependencies for service improvement | Plan |
| Implementation review | Review of roll out or back out | Used to record details & analyze the implementation | Roll out |

Figure 8:
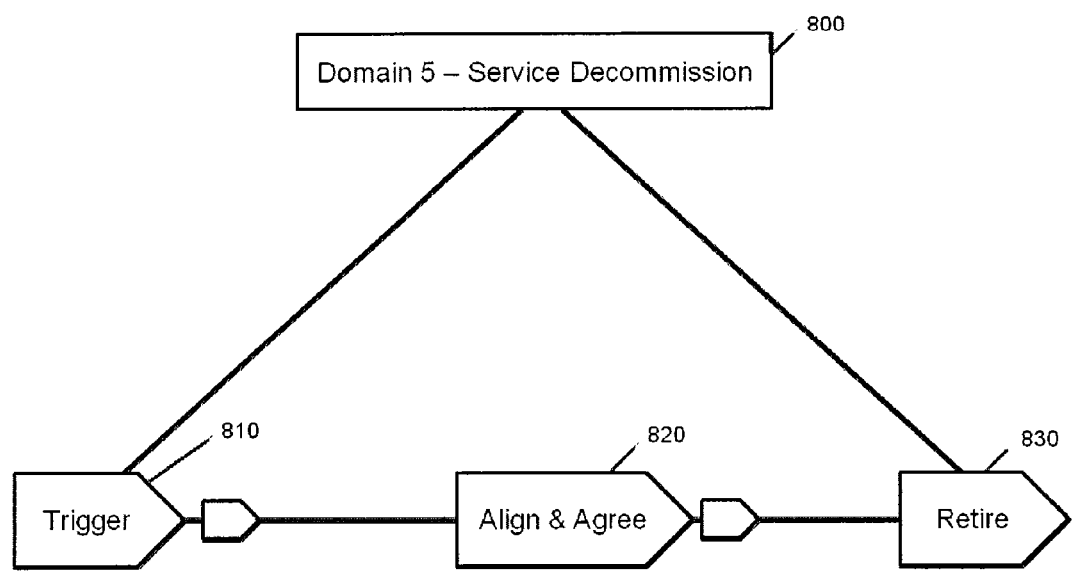
FIG. 8 is a diagram showing the various processes associated with the service decommission domain of the proposed framework, in one embodiment of the present technique.

Referring to FIG. 8, which shows the processes associated with the Service decommission domain. Service Decommission 800 aims at obtaining alignment from organization Service group leadership on retirement of services in order to optimize services in a cost effective manner. Service Decommission 800 also ensures effective contingency plan for the retired services by providing communication and training to the users enabling a seamless & transparent user experience.

Referring to FIG. 8, the trigger process 810 initiates the service decommissioning process by identifying the requirements and reviewing the request drivers. Upon receiving a request for retirement the service enhancer team retrieves all service information including the service's 'System analysis report' & unique identification number from the service knowledge base. Appropriate team shall be engaged based on identified information. In essence, the Retire process 830 triggers the decommissioning of services by identifying the impacted teams and initiate discussion with those teams.

Referring to FIG. 8, the align & agree process 820 deals with requirements gathering for service decommissioning. A detailed service decommission plan is prepared based on the discussions, analyzed requirements and effort/costs estimations for decommissioning. Approval is sought from service stakeholders and PMO based on readiness levels documented in the retirement plan. Once the approval is obtained, the SDR and project plan are updated and retirement is initiated. The process 820 ensure timely communications to and participation from all impacted areas during the decommission of services. Training materials and FAQs are developed for effective awareness & communication of the decommissioned services.

Referring to FIG. 8, the retire process 830 deals with the execution of the plan for retirement of services. The process 830 ensures that the pre retirement activities like ensuring the completion of retirement documents, handover checklist and training to support teams are complete. The service is decommissioned based on the pre-approved plan. Back-out plan needs to be triggered in case of failure. All the stakeholders and end-users are communicated about the retirement of services. A decommission closure report is created and updates are provided to the Change Manager to enable formal closure of decommission of service. A parallel track for Training and knowledge sharing is followed to enable appropriate levels of knowledge to the support teams.

The following Table 6 shows the process assets and their role description and usage with respect to the service decommission domain.

TABLE 6

Process Assets for Service Decommission domain

| Process Assets | Description | Usage | Process Areas |
|---|---|---|---|
| SDR | Service decommission request | A record for tracking specific service decommission progress | Trigger |
| Service decommission criteria checklist | Service decommission criteria checklist | Used to validate criteria for service decommission | Trigger |
| Decommission Project Plan | Project Plan | Project Plan based on understanding of requirements, drivers for retirement and details the resource and cost estimate along with activities that need to be executed for retirement | Align & Agree |
| Training materials & FAQs | Training material for end users & support team | Provides instructions/guidelines on support provided during/after service is decommissioned | Align & Agree |
| Decommission Summary doc. | Decommision summary document | Capture summary of service retirement request, retirement requirements, retirement plan, effort and cost estimates and contingency plan. | Align & Agree |
| Decommission Readiness checklist | Decommission Rediness checklist for retirement readiness | Check readiness for disabling Service to end users | Retire |
| Handover checklist — Decommission | Handover Checklist | Checklist to ensure completeness of service requirements documents before it proceeds for design phase | Retire |
| Closure report | Summary report on service retirement | A report that summarizes the high level details of completed retirement activities for review by leadership | Retire |

In order to meet the Service Domain objectives and drive continuous improvement to services and catalog, key performance indicators and associated metrics are identified. Metrics are defined for each of the Domain areas as shown in the following table 7.

TABLE 7

Service Domain Metrics

| Service Domains | Metrics | Process Areas |
|---|---|---|
| Service Acquisition | No. of Engagement requests (ERs) captured | Discover |
| | No. of engagement completed | |
| | No. of engagements in progress | |
| | No. of ad-hoc requests raised | |
| | No. of Service POAs created | Confirm |
| | No. of Service POAs approved | |
| | No of System Analysis Reports (SAR) submitted | Agree |
| | No of System Analysis Reports (SAR) approved | |
| | Average duration from the time of request initiation to SAR completion | |

TABLE 7-continued

Service Domain Metrics

| Service Domains | Metrics | Process Areas |
|---|---|---|
| Service Design | No. of ERs for which the handover to the design team is complete | Initiate |
| | No. of handovers completed as against SARs (System Analysis reports) completed | |
| | Average time to handover | |

TABLE 7-continued

Service Domain Metrics

| Service Domains | Metrics | Process Areas |
|---|---|---|
| Service Deployment | Duration spent by a Service in the Dev environment | Configure |
| | Duration spent by service in E2 environment | Simulate |
| | No. of defects identified during testing | |
| | No. of defects identified during testing due to design issues | |
| | No. of exceptions raised | |
| | No. of exceptions approved | |
| | Duration spent by a Service in Test environment | |
| | No. of services scheduled | |
| Service Deployment | No. of services implemented | Release |
| | No. of service issues post Deployment | |
| | No. of unsuccessful deployments | |
| | No. of backed out deployments | |
| | No. of issues raised by severity | Transition |

TABLE 7-continued

Service Domain Metrics

| Service Domains | Metrics | Process Areas |
|---|---|---|
| Service Improvement | No. of support documents/FAQs created<br>No. of services covered<br>No. of vendors covered<br>No. of fulfillment teams covered<br>No. of usability surveys completed<br>% of reports completed on time<br>No. of Service review conducted<br>No. of recommendations suggested<br>No. of SIOs created based on recommendations<br>% of SIOs implemented<br>No. of SIOs implemented as against SIO realized | Collect<br><br><br><br><br><br>Benchmark<br><br><br><br>Roll out |
| Service Decommission | Number of decommission opportunities identified<br>Number of service issues post decommission<br>Number of retirements backed out | Trigger<br><br>Retire |

The following Table 8 describes the service domain objectives and their scope in one embodiment of the present technique.

TABLE 8

Service Domain Objectives and scope

| Service Domains | Objectives | Scope |
|---|---|---|
| Service Acquisition | Identification of potential Services that may be offered through the IT Service Catalog<br>Enable a structured approach for service information gathering and validation<br>Ensure leadership alignment and continual support for Service engagements<br>Facilitate collaboration between Service stakeholders and Catalog team to define & align on a to be model for services | The Domain processes capture requirements for Request and Fulfillment aspects of Services and not applicable to the delivery aspects of the service<br>The to be state of services consider the means to offer services through the catalog interface and not enhancements to the backend delivery mechanisms and processes |
| Service Design | To model a request and fulfillment process for the identified services<br>Define and validate the design for services configuration and automation<br>To ensure that all the design documents, models and analysis reports are properly handed over to the service deployment team | The service design and configuration in this domain addresses the request and fulfillment aspect of the services and not the design for actual services itself<br>The inputs considered for service design are service requirements (request & fulfillment), usability and SLA requirements |
| Service Deployment | Effective translation of service design specifications into configurable objects in production environment.<br>Deployment of validated & reliable services in the production environment.<br>Smooth deployment and phased support of the services with minimal or no impact to users | Deployment involves configuration of services within the ITSC and its interaction with Provider's fulfillment tools. |
| Service Improvement | A methodical capture of Usability, Process, & Service delivery related data<br>Effective analysis to identify appropriate Service Improvement opportunities<br>Mechanism for successful implementation of improvements | Scope of the Domain processes are limited to changes that bring tangible improvements to the service attributes defined in the Catalog (Eg: Service Levels & Cost) |
| Service Decommission | Optimization of services to improve services and reduce costs<br>Proactive management of service decommission to minimize effect of retirement upon service quality & user perception | Decommission of services and service components are limited to the service components in ITSC and may not consider the components in the Provider environment |

Thus the proposed actionable service catalog method offers a service interface for business, IT and end-users to request, approve and track services and its delivery. The Actionable Service Catalog method/framework will deliver benefits to:

Business Users—Increased transparency for services & its cost and assist in annual planning & budgeting for services;

End-users—A shopping cart view for requesting and tracking of services that they are entitled to; and Service Delivery Managers—Help manage Service delivery by ensuring service delivery in alignment with the agreement The service catalog is made actionable by building a layer of request and fulfillment over the cataloged services and its attributes as described in one embodiment of the present technique. This allows the customers to view services and the options available, request and avail IT services as needed.

Exemplary Computing Environment

Figure 9:
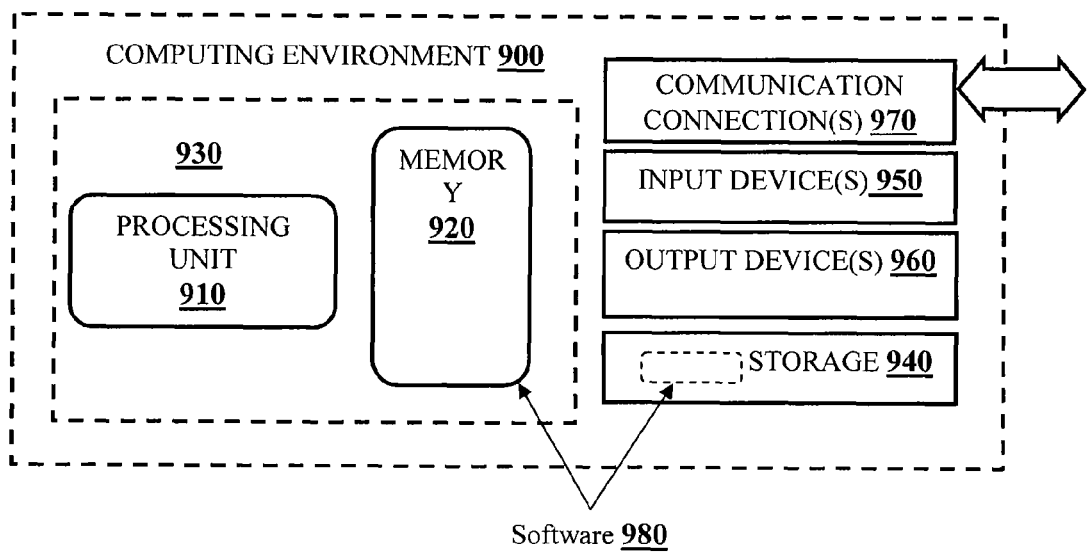
FIG. 9 is a system illustrating a generalized computer network arrangement, in one embodiment of the present technique.

One or more of the above-described techniques may be implemented in or involve one or more computer systems. FIG. 9 illustrates a generalized example of a computing environment 900. The computing environment 900 is not intended to suggest any limitation as to scope of use or functionality of described embodiments.

With reference to FIG. 9, the computing environment 900 includes at least one processing unit 910 and memory 920. In FIG. 9, this most basic configuration 930 is included within a dashed line. The processing unit 910 executes computer-executable instructions and may be a real or a virtual processor. In a multi-processing system, multiple processing units execute computer-executable instructions to increase processing power. The memory 920 may be volatile memory (e.g., registers, cache, RAM), non-volatile memory (e.g., ROM, EEPROM, flash memory, etc.), or some combination of the two. In some embodiments, the memory 920 stores software 980 implementing described techniques.

A computing environment may have additional features. For example, the computing environment 900 includes storage 940, one or more input devices 950, one or more output devices 960, and one or more communication connections 970. An interconnection mechanism (not shown) such as a bus, controller, or network interconnects the components of the computing environment 900. Typically, operating system software (not shown) provides an operating environment for other software executing in the computing environment 900, and coordinates activities of the components of the computing environment 900.

The storage 940 may be removable or non-removable, and includes magnetic disks, magnetic tapes or cassettes, CD-ROMs, CD-RWs, DVDs, or any other medium which may be used to store information and which may be accessed within the computing environment 900. In some embodiments, the storage 940 stores instructions for the software 980.

The input device(s) 950 may be a touch input device such as a keyboard, mouse, pen, trackball, touch screen, or game controller, a voice input device, a scanning device, a digital camera, or another device that provides input to the computing environment 900. The output device(s) 960 may be a display, printer, speaker, or another device that provides output from the computing environment 300.

The communication connection(s) 970 enable communication over a communication medium to another computing entity. The communication medium conveys information such as computer-executable instructions, audio or video information, or other data in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

Implementations may be described in the general context of computer-readable media. Computer-readable media are any available media that may be accessed within a computing environment. By way of example, and not limitation, within the computing environment 900, computer-readable media include memory 920, storage 940, communication media, and combinations of any of the above.

Having described and illustrated the principles of our invention with reference to described embodiments, it will be recognized that the described embodiments may be modified in arrangement and detail without departing from such principles. It should be understood that the programs, processes, or methods described herein are not related or limited to any particular type of computing environment, unless indicated otherwise. Various types of general purpose or specialized computing environments may be used with or perform operations in accordance with the teachings described herein. Elements of the described embodiments shown in software may be implemented in hardware and vice versa.

In view of the many possible embodiments to which the principles of our invention may be applied, we claim as our invention all such embodiments as may come within the scope and spirit of the following claims and equivalents thereto.

While the present invention has been related in terms of the foregoing embodiments, those skilled in the art will recognize that the invention is not limited to the embodiments depicted. The present invention may be practiced with modification and alteration within the spirit and scope of the appended claims. Thus, the description is to be regarded as illustrative instead of restrictive on the present invention.

The invention claimed is:

1. A process-oriented method for developing, via program instructions stored in a memory and executed by a processing unit, an actionable information technology (IT) service catalog in a business environment for managing lifecycle of services through the service catalog, the method comprising:

absorbing service information related to services to be designed, by the processing unit, via service domains defined within an IT service catalog, wherein the service domains represent various lifecycle stages of services from the point of inception of the services to decommission of the services;

designing the services, by the processing unit, within the IT service catalog using service domain components defined in the service domains, the service domain components comprising:

domain processes, process roles, assets and metrics, the domain processes providing procedures for the service domains to perform various activities for managing the services in the various lifecycle stages, the process roles for controlling and monitoring the domain processes, the assets providing service information and facilitating decision making, and the metrics facilitating measurement and improvement of the services;

collecting data, by the processing unit, related to user requirements based on one or more templates defined within the IT service catalog for designing the services;

measuring, by the processing unit, design performance based on the plurality of metrics defined in the IT service catalog and the collected data; and checking, by the processing unit, if the designed services are aligned with predefined requirements using predetermined checklists defined within the IT service catalog, wherein the steps of absorbing, designing, collecting, measuring and checking within the IT service catalog facilitate the development of the actionable IT service catalog, and further wherein the actionable IT service catalog provides an interface for users to access the services.

2. The method as recited in claim 1, wherein service domains further comprising:

validating the need for the services and gathering the service information, by the processing unit, effectively and timely through structured service engagements;

translating, by the processing unit, the service requirements to design specifications to facilitate an automated request and fulfillment process;

translating, by the processing unit, the service design specifications into configurable service objects and exposing to customers;

improving, by the processing unit, the services in terms of delivery and user experience through a constant cycle of monitoring, reporting and enhancements; and optimizing, by the processing unit, the services in a cost effective manner by transforming services or decommissioning of services with minimal or no organizational impact.

3. The method as recited in claim 2, wherein validating the need for services further comprising:

engaging stakeholders to communicate, by the processing unit, IT Service Catalog value and build direction for service engagements;

partnering with stakeholders to gather, by the processing unit, accurate and complete service information;

building, by the processing unit, a Point of Arrival (POA) model for services and obtain alignment from Service stakeholders; and gaining, by the processing unit, alignment on the to-be model and formally obtain sign-off for the service engagement.

4. The method as recited in claim 2, wherein translating the service requirements to design specifications further comprising:

analyzing, by the processing unit, requirements and preparing detailed service design document & workflows; and validating and signing off, by the processing unit, design document and finalize service implementation plan.

5. The method as recited in claim 2, wherein translating the service design specifications into configurable service objects and exposing to customers further comprising:
building and validating, by the processing unit, mock-ups and configuring services in the service development environment;
conducting, by the processing unit, testing, validating results, fixing defects, tracking and obtaining signoff for test results;
releasing, by the processing unit, services to the production environment and communicating to service stakeholders; and
transitioning, by the processing unit services to support team and provide ongoing support for services and service catalog.

6. The method as recited in claim 2, wherein improving the services in terms of delivery and user experience further comprising:
collecting, by the processing unit, service performance data to identify opportunities for improvement;
validating, by the processing unit, performance data with service stakeholders and collating recommendations;
preparing, by the processing unit, detailed service improvement plan and engage stakeholders as needed; and
executing, by the processing unit, improvements by coordinating with Process teams, service delivery and development teams.

7. The method as recited in claim 2, wherein optimizing the services in a cost effective manner further comprising:
initiating, by the processing unit, decommission by creating decommission request and validating the triggers;
preparing, by the processing unit, decommission plan and obtaining signoff from stakeholders & interface areas; and
executing, by the processing unit, decommission based on readiness levels, document and communicating outcomes.

8. The method as recited in claim 1, wherein domain components further comprising:
processes to provide step by step procedures for the Service Domains to accomplish their objectives and sequence of activities performed to manage services in its lifecycle domains;
metrics for tracking and improvement of services within their Domains using set of defined parameters;
assets to enable decision making and movement of Services through the Service domains; and
process roles to facilitate the end to end flow of services through the Service Domains.

9. A computer program product comprising a non-transitory computer usable medium having a computer readable program code embodied thereon to develop a process-oriented information technology (IT) actionable service catalog in a business environment for managing lifecycle of services through the service catalog, comprising:
program code operable to absorb services to be designed, via service domains defined within an IT service catalog, wherein the service domains represent various lifecycle stages of services from the point of inception of the services to decommission of the services;
program code operable to design the services within the IT service catalog using service domain components defined in the service domains, the service domain components comprising: domain processes, process roles, assets and metrics, the domain processes providing procedures for the service domains to accomplish various objectives, the process roles for controlling and monitoring the domain processes, the assets providing service information and facilitating decision making, and the metrics facilitating measurement and improvement of the services;
program code operable to collect data related to user requirements based on one or more templates defined within the IT service catalog for designing the services;
program code operable to measure design performance based on the plurality of metrics defined in the IT service catalog and the collected data; and
program code operable to check if the designed services are aligned with predefined requirements using predetermined checklists defined within the IT service catalog, wherein the steps of absorbing, designing, collecting, measuring and checking within the IT service catalog facilitate the development of the actionable IT service catalog, and further wherein the IT service catalog provides an interface for users to access the services.

10. The product of claim 9, wherein service domains further comprising:
program code operable to validate the need for the services and to gather the service information effectively and timely through structured service engagements;
program code operable to translate the service requirements to design specifications to facilitate an automated request and fulfillment process;
program code operable to translate the service design specifications into configurable service objects and exposing to customers;
program code operable to improve the services in terms of delivery and user experience through a constant cycle of monitoring, reporting and enhancements; and
program code operable to optimize the services in a cost effective manner by transforming services or decommissioning of services with minimal or no organizational impact.

11. The product of claim 10, wherein validating the need for services further comprising:
program code operable to engage stakeholders to communicate IT service catalog value and build direction for service engagements;
program code operable to partner with stakeholders to gather accurate and complete service information;
program code operable to build a Point of Arrival (POA) model for services and obtain alignment from Service stakeholders; and
program code operable to gain alignment on the to-be model and formally obtain sign-off for the service engagement.

12. The product of claim 10, wherein translating the service requirements to design specifications further comprising:
program code operable to analyze requirements and prepare detailed service design document & workflows; and
program code operable to validate and signoff design document and finalize service implementation plan.

13. The product of claim 10, wherein translating the service design specifications into configurable service objects and exposing to customers further comprising:
program code operable to build and validate mock-ups, and configure services in the service development environment;
program code operable to conduct testing, validate results, fix defects, and track and obtain signoff for test results;

program code operable to release services to the production environment and communicate to service stakeholders; and program code operable to transition services to support team and provide ongoing support for services and service catalog.

14. The product of claim 10, wherein improving the services in terms of delivery and user experience further comprising:

program code operable to collect service performance data to identify opportunities for improvement;

program code operable to validate performance data with service stakeholders and collate recommendations;

program code operable to prepare detailed service improvement plan and engage stakeholders as needed; and program code operable to execute improvements by coordinating with process teams, service delivery and development teams.

15. The product of claim 10, wherein service optimizing the services in a cost effective manner further comprising:

program code operable to initiate decommission by creating decommission request and validating the triggers;

program code operable to prepare decommission plan and obtain signoff from stakeholders & interface areas; and program code operable to execute decommission based on readiness levels, document and communicating outcomes.

16. The product of claim 10, wherein domain components further comprising;

program code operable to implement processes to provide step by step procedures for the Service Domains to accomplish their objectives and sequence of activities performed to manage services in its lifecycle domains;

program code operable to use metrics for tracking and improvement of services within their Domains using set of defined parameters;

program code operable to use assets to enable decision making and movement of Services through the Service domains; and program code operable to use process roles to facilitate the end to end flow of services through the Service Domains.

* * * * *